June 15, 1948.  C. J. HERMAN  2,443,456

DYNAMOELECTRIC MACHINE

Filed July 25, 1947

Inventor:
Clairmont J. Herman,
by *Orwell S. Mack*
His Attorney.

Patented June 15, 1948

2,443,456

UNITED STATES PATENT OFFICE 2,443,456

DYNAMOELECTRIC MACHINE

Clairmont J. Herman, Fort Wayne, Ind., assignor to General Electric Company, a corporation of New York Application July 25, 1947, Serial No. 763,592

5 Claims. (Cl. 171—252)

This invention relates to members for dynamoelectric machines and more particularly to improved means for making connections between windings and for anchoring the winding leads.

In the conventional construction of dynamoelectric machines, the connections between the ends of individual windings require insulation over the connection joints and also require lacing over the insulation to anchor it in place on the windings. In addition, the leads to the windings are tied down by lacing in order to prevent tension on the lead from damaging the winding.

It is an object of this invention to provide an improved member for a dynamoelectric machine.

Another object of this invention is to provide improved means for making connections between windings of dynamoelectric machines.

A further object of this invention is to provide improved means for anchoring winding leads of dynamoelectric machines.

Further objects and advantages of this invention will become apparent and the invention will be better understood from the following description referring to the accompanying drawing, and the features of novelty which characterize this invention will be pointed out with particularity in the claims annexed to and forming part of this specification.

A feature of this invention is the provision of connectors secured to the slot wedges, the connections between the windings and between the leads and the windings being made at these connectors.

Figure 1:
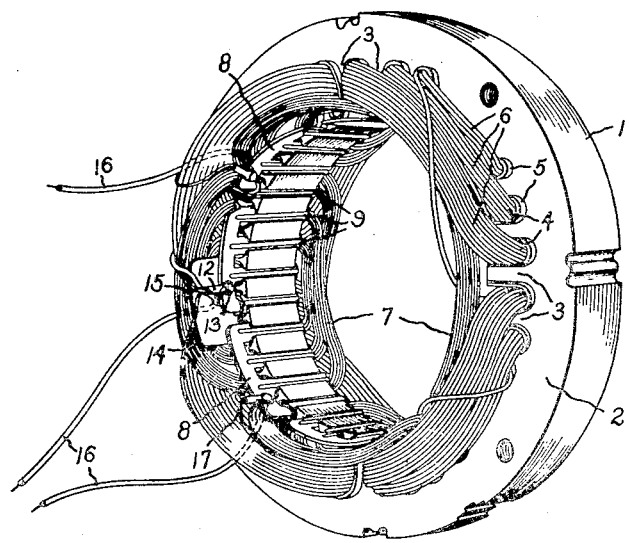
Figure 2:
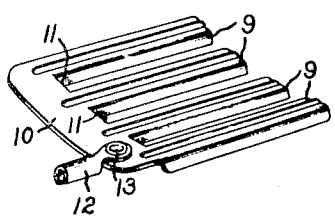
Figure 3:
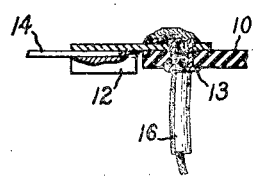

In the drawing, Fig. 1 illustrates a stationary member for a dynamoelectric machine incorporating the improved winding connection and lead anchoring means of this invention. Fig. 2 is a detailed illustration of the method of securing a connector to a slot wedge. Fig. 3 illustrates the connection of a lead to a coil winding end according to this invention.

Referring now to Fig. 1, there is shown a stationary member for a dynamoelectric machine having a magnetizable core 1 which may be conventionally formed of a plurality of relatively thin laminations. The core consists of a main or yoke portion 2 having teeth 3 extending radially inward therefrom to form a plurality of coil-winding slots 4. These slots are provided with liners 5 formed of insulating material such as is described in Patents 2,169,097 and 2,180,983 to Hall. These slot liners are formed from an extruded strip of material having cuffed or beaded edges which abut the sides of the slots 4. In the embodiment of the invention shown in Fig. 1, the slots are shown as containing superimposed liners of turns or sides of different coils and, specifically, the layer of coil sides of insulated motor running windings 6 and over that layer, a second layer of coil sides of insulated motor starting windings 7.

In order to provide for holding the windings in place and for closing the slots 4, slot wedge members 8 are positioned in the slots 4 over the windings. These slot wedge members are more fully described in application Serial No. 763,591, filed July 25, 1947, of the present inventor and assigned to the assignee of this application. These members are moulded of flexible insulating material, preferably of a plastic of the type including superpolyamide resins, such as the reaction product of hexamethylene, diamine and adipic acid, the reaction product of hexymethylene, diamine and sebacic acid, or alternatively the polyvinyl in acetals such as the reaction product of a partially hydrolyzed, polyvinyl, acelate and aldehyde, such as formaldehyde or butyraldehyde.

As shown in Fig. 2, these members are formed as a single unitary structure and are constituted of a plurality of slot wedge fingers 9 and a transverse portion 10 joining wedges at one end. While the wedge member is shown here as including four slot wedges 9, it will be understood that any number of such wedges can be provided. Wedge members comprising from 2 to 36 slot wedges have been used in the construction of motors of fractional horsepower frame sizes. However, it has been found that wedge members having from 2 to 4 slot wedges are the most satisfactory from a cost and assembly standpoint. The provision of these multiple slot wedges reduces the tendency of the individual slot wedges to twist and partially offset as they are inserted into the slots. In addition, this feature permits the insertion of a number of wedges at one time thus greatly reducing the time required for assembly of the machine.

The slot wedges 9 are formed of substantially U-shaped cross-section, the lips of the wedges abutting the interior walls of the slots 4 and the concave surface being formed toward the winding side of the slot. For motors of fractional horsepower frame sizes, slot wedges vary in overall length from approximately 1" to 5" depending on the thickness of the stator punchings. For purposes of the present invention, for a slot wedge length of 1½", a satisfactory width of the transverse portion 10 was found to be ½". The friction of the wedges against the walls of the slots 4 hold the wedges securely in place, regardless of vibration, gravity, and centrifugal force. Thus the wedges firmly hold the windings in the slots and individual wires can not creep past the wedges into the air gap of the machine.

The transverse portions 10 are curved to conform to the curvature of the stator member 1 and in assembly are substantially abutting to form a substantial annulus around the core adjacent the slots. On assembly, when the slot wedge member 8 is inserted in the slots 4, the inner edges 11 of the transverse portion 10 seat against the cuffed or beaded edges of the slot liners.

It will now be apparent that the construction as thus far described, in the provision of the transverse portions 10 of the slot wedges 8, provides a secure location for affixing connections between the various wires of the machine. In order to accomplish this result, a plurality of spade type connectors 12 are secured to the annular portions 10 of the slot wedges 8 by eyelets 13. The ends 14 of the various windings are connected together in the appropriate relationship by these connectors by conventional means such as soldering. Such a connection is shown at 15 in Fig. 1. In addition, the external leads 16 are connected to the winding ends by these connectors and such a connection is shown at 17 in Fig. 1, and in Fig. 3. Here, the end of the lead 16 is brought through the eyelet and soldered to the top of the connector 12, the winding end 14 being soldered in the sleeve portion of the connector 12.

It will now be apparent that this improved construction eliminates the necessity for individual insulation over the connection joints between the several windings and, since the connection is made on the slot wedge which is securely positioned in the slot openings, the necessity for lacing to anchor the joints in place on the windings is also eliminated. The external leads to the machine are securely anchored by the connectors to the slot wedges thus eliminating the requirement for lacing to tie down these leads in order to prevent damage to the windings by excessive tension on the leads. This improved construction permits the entire elimination of end-turn lacing and also practically eliminates failures due to joint insulation and hidden connections which cannot be inspected. By providing positive, non-slip lead anchorages which facilitate the attainment of uniform lead-positioning and uniform length in mass production and due to the elimination of lacing, this construction greatly facilitates uniformity and speed of production thus substantially reducing the manufactured cost.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. In combination, a dynamoelectric machine having a plurality of winding slots formed therein, a plurality of windings positioned in said slots, a plurality of slot wedge means for closing said slots and for holding said windings in place, each of said slot wedge means having a plurality of fingers adapted to be inserted in said slots and a portion joining said fingers at one end, and a plurality of connector means secured to said slot wedge means connecting the ends of said windings together and anchoring the leads to said windings.

2. In combination, a dynamoelectric machine having a plurality of winding slots formed therein, a plurality of windings positioned in said slots, a plurality of insulating means for closing said slots and for holding said windings in place, each of said means having a plurality of fingers adapted to be inserted in said slots and a portion joining said slots at one end, and a plurality of connector means secured to said portions for making connections between said windings and for anchoring the leads to said windings.

3. In combination, a dynamoelectric machine having a plurality of winding slots formed therein, a plurality of windings positioned in said slots, a plurality of slot wedge members for closing said slots and holding said windings in place, each of said members having a plurality of fingers adapted to be inserted in said slots and a portion joining said fingers at one end, and a plurality of metallic connecting means secured to said portions connecting the ends of said windings together and anchoring the leads to said windings.

4. In combination, a dynamoelectric machine having a plurality of winding slots formed therein, a plurality of windings positioned in said slots, a plurality of insulating slot wedge members for closing said slots and holding said windings in place, each of said members having a plurality of fingers adapted to be inserted in said slots and an annular portion joining said fingers at one end exterior to said member, and connectors respectively secured to said portions connecting the ends of said windings together and connecting the leads to said windings whereby separate insulation for the connections between said windings is eliminated and the leads to said windings are anchored in place preventing damage to said windings.

5. In combination, a dynamoelectric machine having a plurality of winding slots formed therein, a plurality of windings positioned in said slots, a plurality of insulating slot wedge members for closing said slots and holding said windings in place, each of said members having a plurality of fingers adapted to be inserted in said slots and an integral annular portion joining said fingers at one end exterior to said member, and a plurality of spade type metallic connectors secured to said portions, the connections between the ends of said windings and between the leads and said windings being made on said connectors whereby separate insulation for the connections between said windings is eliminated and the leads to said windings are anchored in place preventing damage to said windings.

CLAIRMONT J. HERMAN.